United States Patent
Bürgel

(10) Patent No.: US 9,421,749 B2
(45) Date of Patent: Aug. 23, 2016

(54) APPARATUS AND METHOD FOR SELF ADHESIVE BALANCING WEIGHT LINER REMOVAL

(71) Applicant: Wegmann automotive GmbH & Co. KG, Veitshöchheim (DE)

(72) Inventor: Hans-Ulrich Bürgel, Roden (DE)

(73) Assignee: WEGMANN AUTOMOTIVE GMBH & CO. KG, Veitschochheim (DE)

( * ) Notice: Subject to any disclaimer, the term of this patent is extended or adjusted under 35 U.S.C. 154(b) by 0 days.

(21) Appl. No.: 14/473,238

(22) Filed: Aug. 29, 2014

(65) Prior Publication Data

US 2014/0367050 A1 Dec. 18, 2014

Related U.S. Application Data

(63) Continuation of application No. PCT/EP2013/053593, filed on Feb. 22, 2013.

(30) Foreign Application Priority Data

Mar. 20, 2012 (EP) .................................. 12160444
Jul. 13, 2012 (EP) .................................. 12176445

(51) Int. Cl.
*B32B 38/10* (2006.01)
*B32B 43/00* (2006.01)
(Continued)

(52) U.S. Cl.
CPC ............ *B32B 43/006* (2013.01); *F16F 15/32* (2013.01); *G01L 11/025* (2013.01); *B32B 38/10* (2013.01);
(Continued)

(58) Field of Classification Search
CPC ............... B32B 38/10; B32B 43/006; Y10T 156/1994; Y10T 156/1195; Y10T 156/1174; Y10T 156/1179; Y10T 156/1184; Y10T 156/195; Y10T 156/1983
USPC ........ 156/715, 759, 719, 767, 716, 717, 765
See application file for complete search history.

(56) References Cited

U.S. PATENT DOCUMENTS 4,405,401 A * 9/1983 Stahl ........................ G09F 3/04
156/248
5,540,809 A * 7/1996 Ida et al. ...................... 156/760
(Continued)

FOREIGN PATENT DOCUMENTS

DE   10 2007 014461   7/2008
EP   1 253 414        10/2002
(Continued)

OTHER PUBLICATIONS

International Search Report and Written Opinion in International Application No. PCT/EP2013/053593 dated Apr. 17, 2013.
(Continued)

*Primary Examiner* — Mark A Osele
*Assistant Examiner* — Nickolas Harm
(74) *Attorney, Agent, or Firm* — Norton Rose Fulbright US LLP

(57) ABSTRACT

An apparatus for removal of the liner of a self-adhesive balancing weight is disclosed. A stripper wheel or stripper belt is rotated in close proximity over the surface of a balancing weight, and interacting with the liner and pulling the liner off from the balancing weight by means of a plurality of teeth. The speed of the stripper wheel or stripper belt is slightly higher than the speed of motion of the balancing weight.

21 Claims, 4 Drawing Sheets

(51) Int. Cl.
*F16F 15/32* (2006.01)
*G01L 11/02* (2006.01)
*G01M 1/32* (2006.01)
*G01M 1/02* (2006.01)

(52) U.S. Cl.
CPC ............... *G01M 1/02* (2013.01); *G01M 1/326* (2013.01); *Y10T 156/1174* (2015.01); *Y10T 156/1195* (2015.01); *Y10T 156/195* (2015.01); *Y10T 156/1956* (2015.01); *Y10T 156/1994* (2015.01)

(56) References Cited

U.S. PATENT DOCUMENTS

| | | | |
|---|---|---|---|
| 5,766,349 A * | 6/1998 | Soyama et al. | 118/120 |
| 6,364,421 B1 | 4/2002 | Pursley | 301/5.21 |
| 6,500,298 B1 * | 12/2002 | Wright et al. | 156/708 |
| 6,547,338 B2 * | 4/2003 | Gross | G01M 1/326 |
| | | | 301/5.21 |
| 7,044,561 B2 * | 5/2006 | Petchel et al. | 301/5.21 |
| 7,481,901 B2 * | 1/2009 | Toyoda et al. | 156/248 |
| 2002/0124948 A1 * | 9/2002 | Mikkelsen et al. | 156/247 |
| 2003/0029562 A1 * | 2/2003 | Yotsumoto et al. | 156/344 |
| 2007/0204955 A1 * | 9/2007 | Manners | E04G 23/006 |
| | | | 156/763 |
| 2008/0113486 A1 * | 5/2008 | Eguchi et al. | 438/458 |
| 2008/0216955 A1 * | 9/2008 | Neeper et al. | 156/344 |
| 2009/0032187 A1 * | 2/2009 | Hiranaka | B32B 43/006 |
| | | | 156/703 |

FOREIGN PATENT DOCUMENTS

EP 1 613 876 1/2006
WO WO 2008/103651 8/2008

OTHER PUBLICATIONS

International Preliminary Report on Patentability in International Application No. PCT/EP2013/053593 dated Sep. 23, 2014.

* cited by examiner

APPARATUS AND METHOD FOR SELF ADHESIVE BALANCING WEIGHT LINER REMOVAL

PRIORITY CLAIM

This application is a continuation of pending International Application No. PCT/EP2013/053593 filed on 22 Feb. 2013, which designates the United States and claims priority from European Application No. 12160444.1 filed on Mar. 20, 2012 and European Application No. 12176445.0 filed on Jul. 13, 2012, all of which are incorporated by reference in their entireties.

BACKGROUND OF THE INVENTION

1. Field of the Invention

The invention relates to methods and devices for dispensing weights used in vehicle ballasting applications, in particular for dispensing weights used in balancing automobile or other vehicle wheels.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This has the drawback that a solid balancing weight is significantly more robust and reliable than these continuous tapes.

SUMMARY OF THE INVENTION

The embodiments are based on the object of stripping off the liner from an adhesive tape of balancing weights without damaging the adhesive tape and further without damaging the metal surface of the balancing weight. Furthermore, peeling-off should be done automatically in large volumes for low costs. It should be reliable without residing fractions of the liner on the adhesive tape.

In an embodiment, the liner is removed by a stripper wheel which rotates over the metal surface of the balancing weight, in a close proximity to be in contact with the liner but not with the metal surface of the balancing weight. Preferably, the stripper wheel rotates at a speed similar to the speed of movement of the balancing weight. Most preferably, the rotation speed of the stripper wheel is slightly higher than the speed of movement of the balancing weight.

It is further preferred, if means for precise guiding of the balancing weight are provided. This improves reliability and repeatability of the stripping process and further prevents the stripper wheel to touch the metal surface of the balancing weight. Such means for guiding the balancing weight may be a pressure roller. Such a pressure roller may press the balancing weight against a surface which is further referred to as pressure plate. The pressure roller may be a single role or a belt-conveyer-like assembly having at least one, preferably two pulleys for moving the belt. Furthermore, an aspirator or a vacuum cleaning device may be provided for removing the liner from the stripper wheel.

In a further embodiment, instead of the stripper wheel, a stripper belt may be used. It may be driven by at least one, preferably two stripper pulleys. Instead of a wheel or a belt, any other device having teeth at its outside and rotating with a speed similar to the speed of movement of the balancing weight may be used. Preferably, the stripper wheel or stripper pulley has saw-tooth-like teeth, which are rotating in the direction of rotation, the direction of movement of the balancing weight.

In another embodiment, the direction of rotation of the stripper wheel or stripper pulley may be reversed together with a reverse order of the teeth, resulting in stripping off the liner before the stripping wheel or belt.

It is further preferred, if for supplying balancing weights to the liner removal unit, a belt conveyer is provided. Such a belt conveyer may bring up the force to push a balancing weight through the liner removal unit under the stripper wheel and/or stripper belt.

In a further embodiment, a plurality of stripper wheels or belts may be provided either in parallel and/or one after the other.

In a further embodiment, means for adjusting the stripper wheel or stripper belt in relation to the balancing weight may be provided. This may compensate for tolerances in the thickness of the balancing weight. The adjustment may be done by spring loading the stripper wheel or stripper belt, and therefore asserting a predetermined force on the balancing weight. An alternative embodiment would be to use a stripper wheel or stripper belt having a comparatively broad surface and small teeth on it, whereas the surface is smoothly lying on the surface of the liner, while the teeth penetrate into the liner. The surface may also be made of elastic material to perfectly adapt to deviations in the surface of the liner. An alternate embodiment would be to couple the stripper wheel or stripper belt with the pressure roller or at least one of the pressure pulleys. When a balancing weight with a certain thickness is guided through the pressure roller 20, the pressure roller is lifted to height of the balancing weight, also causing the stripper wheel or stripper belt to be lifted to the same height. This may be done by some electronic controlling or by simple mechanical coupling.

The advantage of the embodiments is that the liner can be removed reliably. Furthermore, the liner may be removed at comparatively high speeds. This design allows comparatively small tolerances of the stripper wheel and/or stripper belt and means for guiding the balancing weight, which results in a comparatively small damage of the adhesive tape under the liner. Furthermore, a damage of the surface of the balancing weight can be completely avoided. This surface must not be damaged as corrosion may occur, starting at damaged sections.

BRIEF DESCRIPTION OF THE DRAWINGS

In the following, the invention will be described by way of example, without limitation of the general inventive concept, on examples of embodiment and with reference to the drawings.

Figure 1:
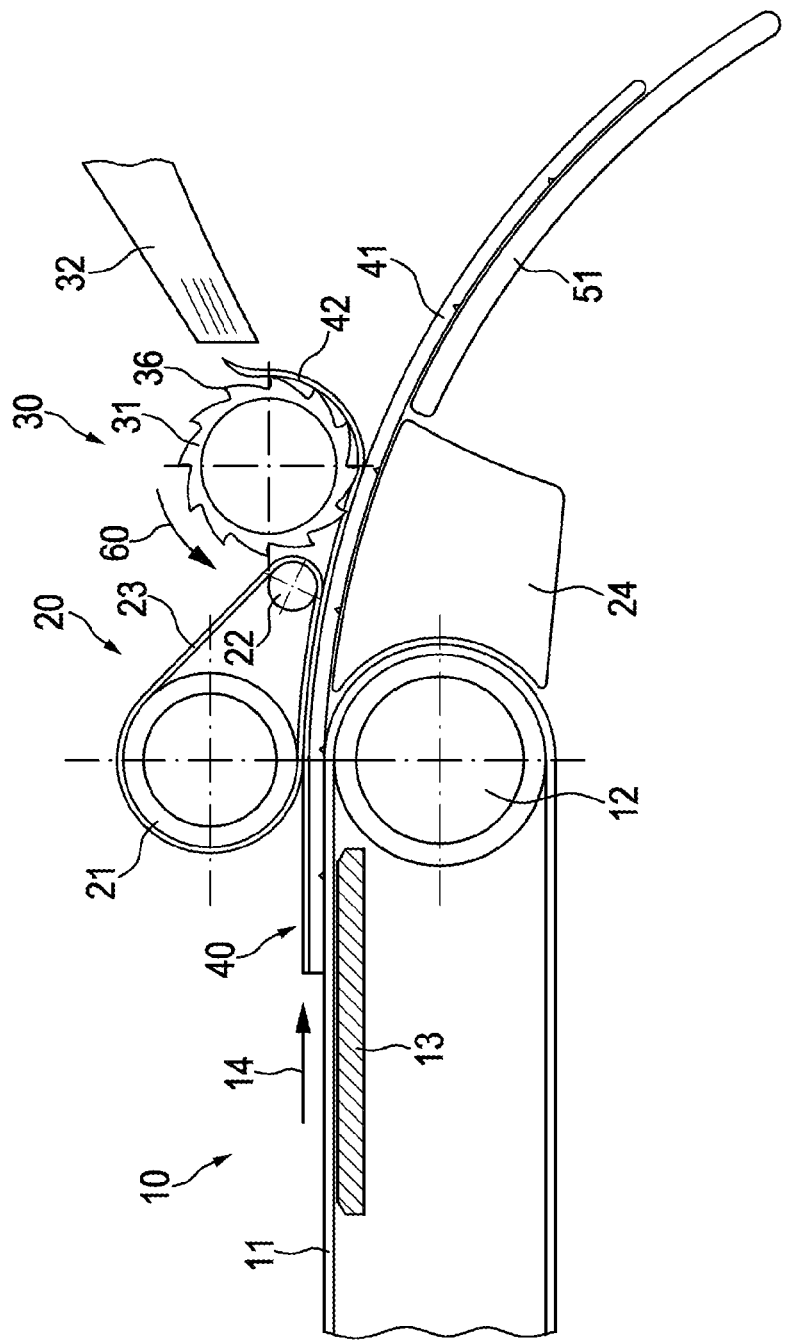
FIG. 1 shows a liner removal unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a liner removal unit is shown. For stripping off the liner 42 of a balancing weight body 41, a stripper wheel 31 is provided. It is rotating in direction 60 which is the same as the direction of movement 14 of the balancing weight. The speed of rotation is similar to the speed of movement of the balancing weight. Preferably, the speed of rotation is slightly higher. The stripper wheel has teeth which interact with the liner 41 and 42, and pull it away from the balancing weight. An aspirator 32 or a similar vacuum cleaning device further removes the liner 42 from the stripper wheel 31. To prevent the balancing weight from being lifted up by slightly sticking to the liner, preferably the pressure device, almost preferably a pressure roller 20 is provided. Such a pressure roller may be a single roller. Instead, here a pressure belt 23 is driven by a pressure pulley 21 and diverted via auxiliary pulley 22. Here, pressure builds up between the pressure roller 20 and pressure plate 24. Pressure roller 20 may be used for precision control of the speed of motion of the balancing weight 40, which therefore can precisely be adapted to the speed of the stripper wheel 31 or stripper belt 33. Pressure to the balancing weights may also be asserted by the stripper wheel or its shaft, which may bend the balancing weight into a desired radius. The balancing weight is further guided by a sliding surface 51. The balancing weight is fed into the liner removal unit by a belt conveyer 10 comprising of a belt 11, a conveyer pulley 12, and a support plate 13.

Figure 2:
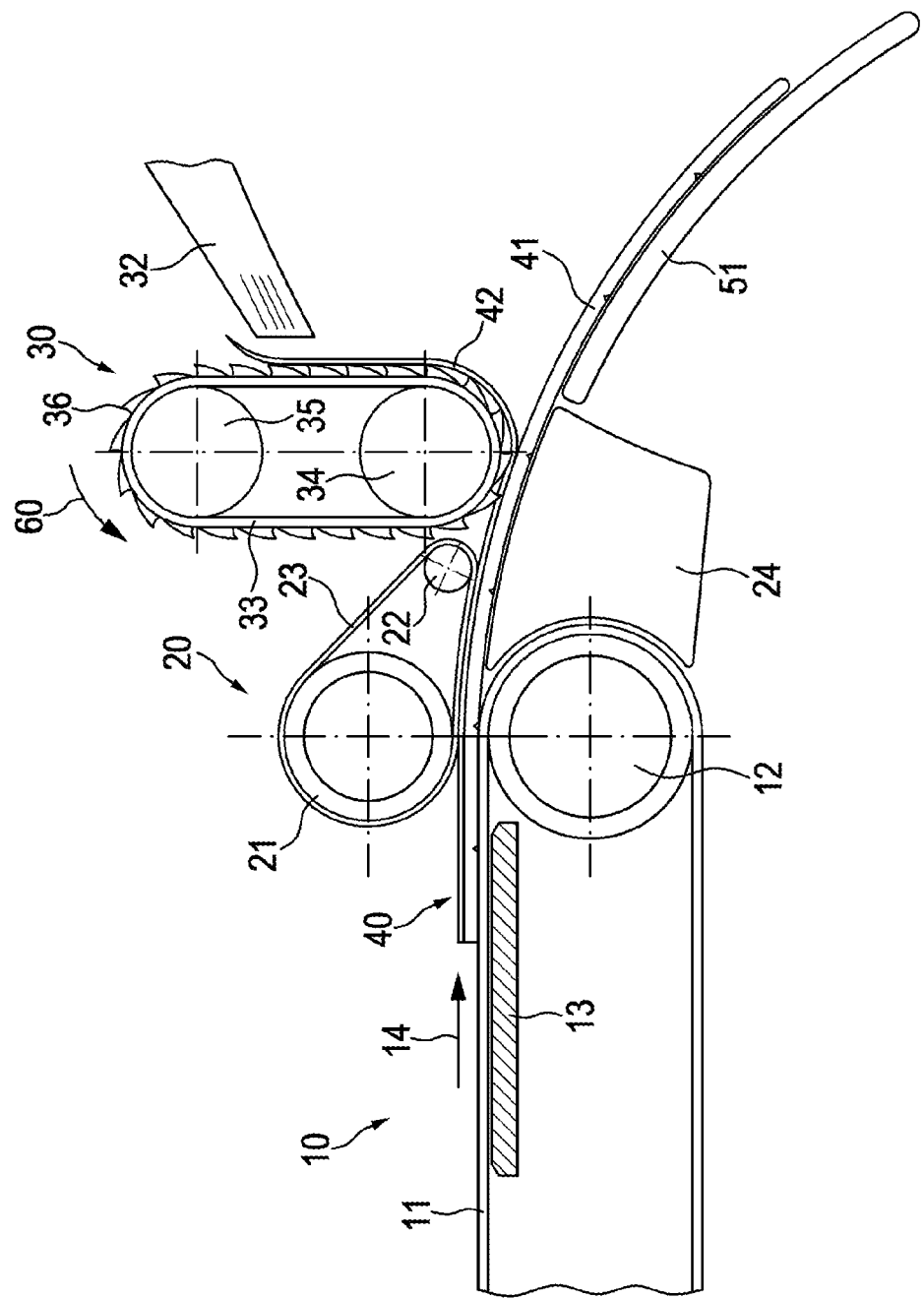
FIG. 2 shows a liner removal unit with a stripper belt.

FIG. 2 shows a liner removal unit comparable to the unit shown in the previous FIG. 1. The main difference is that the stripper wheel 31 is replaced by a stripper belt 33. Here, the stripper belt 33 has teeth 36, which pull off the liner from the balancing weight. The stripper belt is moved by two stripper pulleys 34, 35.

Figure 3:
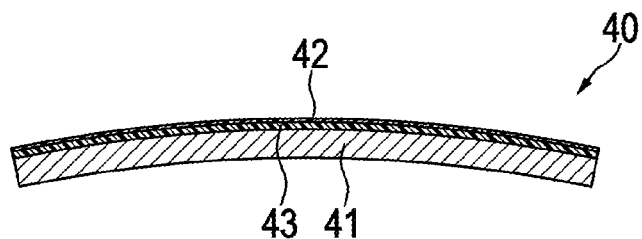
FIG. 3 shows a balancing weight.

In FIG. 3, a balancing weight is shown. A balancing weight body is made of a metal or a metal-plastic composition providing mass, and therefore taking the function of the weight. For fixing the balancing weight to a rim, an adhesive tape 43 is provided. For protection, the adhesive tape is covered by a liner 42 which must be peeled off before applying the balancing weight to a rim.

Figure 4:
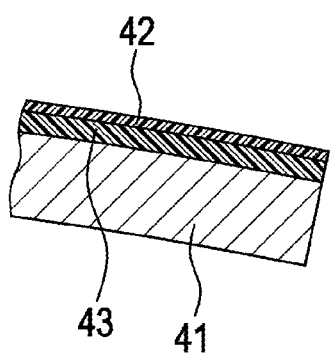
FIG. 4 shows an adhesive tape in detail.

FIG. 4 shows the adhesive tape in detail. The liner 42 is stiffer than the adhesive tape itself, while the adhesive tape consists of a comparatively elastic material. When the teeth of the stripper wheel or stripper belt penetrate through liner 42, they also penetrate into adhesive tape 43. Due to the elastic nature of this material, the teeth will make small cuts into this material instead of lifting the adhesive tape of the balancing weight body 41. The liner 42 which is comparatively stiff, cannot completely be cut by the teeth, and therefore sticks to the teeth and can be removed.

Figure 5:
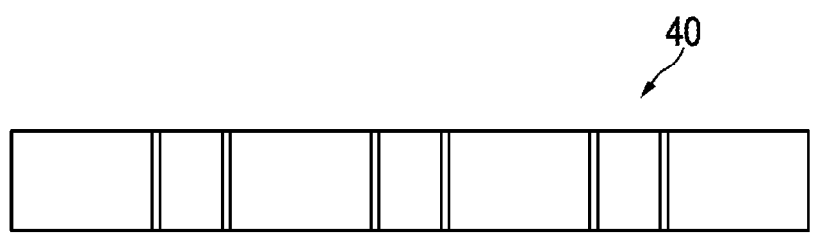
FIG. 5 shows a balancing weight.

FIG. 5 shows a balancing weight 40 which is divided in a plurality of sections which can be separated as required.

Figure 6:
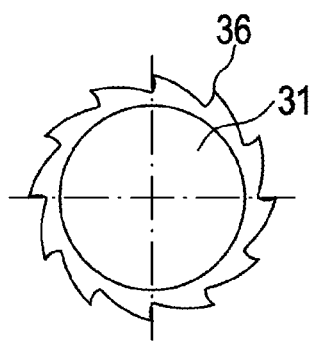
FIG. 6 shows a stripper wheel in a side view.

In FIG. 6, a stripper wheel with teeth 36 is shown in a side view.

Figure 7:
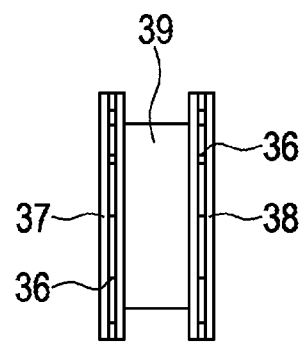
FIG. 7 shows a stripper wheel in a front view.

In FIG. 7, a stripper wheel is shown in a front view. Here, a first wheel disk 37 and a second wheel disk 38, both having teeth 36, are connected by a shaft 39 to rotate synchronously. It is obvious that any other number of wheel disks 37, 38 may be attached to a stripper wheel. The same applies to stripper belts. The shaft 39 may have a diameter slightly smaller than the wheel disks to prevent a deeper penetration of the wheel disks into the adhesive tape.

It will be appreciated to those skilled in the art having the benefit of this disclosure that this invention is believed to provide balancing weights and a method for stripping a liner of an adhesive tape. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 belt conveyer
11 belt
12 conveyer pulley
13 support plate
14 direction of movement
20 pressure roller
21 pressure pulley
22 auxiliary pulley
23 pressure belt
24 pressure plate
30 stripper
31 stripper wheel
32 aspirator
33 stripper belt
34, 35 stripper pulley
36 teeth
37, 38 wheel disk
39 shaft
40 balancing weight
41 balancing weight body
42 liner
43 adhesive tape
51 sliding surface
60 direction of rotation

The invention claimed is:

1. Apparatus for removing a liner from a self-adhesive balancing weight, the apparatus comprising:
   means for transporting the balancing weight in a first direction;

at least one stripper wheel or stripper belt comprising a plurality of teeth and configured to move in contact with the liner but not in contact with a surface of the balancing weight such that the plurality of teeth penetrate and interact with the liner to pull the liner away from the surface of the balancing weight; and a pressure roller configured to press the balancing weight to a surface of a pressure plate opposed to the at least one stripper wheel or stripper belt.

2. Apparatus according to claim 1, wherein a direction of movement of the at least one stripper wheel or stripper belt is the same as the first direction.

3. Apparatus according to claim 1, wherein the at least one stripper wheel or stripper belt is configured to move at the same as the speed as the means for transporting is configured to move the balancing weight.

4. Apparatus according to claim 1, wherein the at least one stripper wheel or stripper belt is configured to move at a slightly higher speed than the means for transporting is configured to move the balancing weight.

5. Apparatus according to claim 1, wherein the means for transporting comprises a belt conveyor configured to transport the balancing weight to the at least one stripper wheel or stripper belt.

6. Apparatus according to claim 1, wherein the pressure roller comprises:
a first pulley;
a second pulley; and
a belt extending around the first and second pulleys.

7. Apparatus according to claim 6, where the first pulley is configured to drive the belt.

8. Method for removing a liner from a self-adhesive balancing weight, the method comprising:
transporting the balancing weight in a first direction;
applying at least one stripper wheel or stripper belt comprising a plurality of teeth and moving in contact with the liner but not in contact with a surface of the balancing weight such that the plurality of teeth penetrate and interact with the liner to pull the liner away from the surface of the balancing weight; and
applying a pressure roller to press the balancing weight to a surface of a pressure plate opposed to the at least one stripper wheel or stripper belt.

9. Method according to claim 8, wherein a direction of movement of the at least one stripper wheel or stripper belt is the same as the first direction.

10. Method according to claim 8, wherein the at least one stripper wheel or stripper belt moves at the same speed as the balancing weight.

11. Method according to claim 8, wherein the at least one stripper wheel or stripper belt moves at a slightly higher speed than the balancing weight.

12. Method according to claim 8, wherein the balancing weight is transported by a belt conveyor for supplying a balancing weight to the at least one stripper wheel or stripper belt.

13. Method according to claim 8, wherein the pressure roller comprises:
a first pulley;
a second pulley; and
a belt extending around the first and second pulleys.

14. Method according to claim 13, where the belt is driven by the first pulley.

15. Apparatus for removing a liner from a self-adhesive balancing weight, the apparatus comprising:
a pulley or roller configured to transport the balancing weight in a first direction;
at least one stripper wheel or stripper belt comprising a plurality of teeth and configured to move in in contact with the liner but not in contact with a surface of the balancing weight such that the plurality of teeth penetrate and interact with the liner to pull the liner away from the surface of the balancing weight; and
a pressure roller configured to press the balancing weight to a surface of a pressure plate opposed to the at least one stripper wheel or stripper belt.

16. Apparatus according to claim 15, wherein a direction of movement of the at least one stripper wheel or stripper belt is the same as the first direction.

17. Apparatus according to claim 15, wherein the at least one stripper wheel or stripper belt is configured to move at the same as the speed as the pulley or roller is configured to move the balancing weight.

18. Apparatus according to claim 15, wherein the at least one stripper wheel or stripper belt is configured to move at a slightly higher speed than the pulley or roller is configured to move the balancing weight.

19. Apparatus according to claim 15, further comprising a conveyor belt configured to be moved by the pulley or roller to transport the balancing weight to the at least one stripper wheel or stripper belt.

20. Apparatus according to claim 15, wherein the pressure roller comprises:
a first pulley;
a second pulley; and
a belt extending around the first and second pulleys.

21. Apparatus according to claim 20, where the first pulley is configured to drive the belt.

* * * * *